(12) United States Patent
Fastrez et al.

(10) Patent No.: US 10,562,473 B2
(45) Date of Patent: Feb. 18, 2020

(54) ELECTRIC CURRENT DISTRIBUTION SYSTEM FOR A VEHICLE

(71) Applicant: Delphi France SAS, Roissy (FR)

(72) Inventors: Stephane Fastrez, Argiesans (FR); Sylvain Pirali, Nogent-sur-Marne (FR)

(73) Assignee: Delphi France SAS (FR)

( * ) Notice: Subject to any disclaimer, the term of this patent is extended or adjusted under 35 U.S.C. 154(b) by 96 days.

(21) Appl. No.: 15/755,287

(22) PCT Filed: Sep. 1, 2016

(86) PCT No.: PCT/EP2016/070646
§ 371 (c)(1),
(2) Date: Feb. 26, 2018

(87) PCT Pub. No.: WO2017/037192
PCT Pub. Date: Mar. 9, 2017

(65) Prior Publication Data
US 2018/0326930 A1   Nov. 15, 2018

(30) Foreign Application Priority Data

Sep. 4, 2015 (FR) .................................... 15 58228

(51) Int. Cl.
*B60R 16/023* (2006.01)
*B60R 16/00* (2006.01)
*B60R 16/02* (2006.01)

(52) U.S. Cl.
CPC ........ *B60R 16/0239* (2013.01); *B60R 16/005* (2013.01); *B60R 16/0207* (2013.01); *B60R 16/0238* (2013.01)

(58) Field of Classification Search
CPC ... B60R 16/02; B60R 16/023; B60R 16/0207; B60R 16/0238; B60R 16/005;
(Continued)

(56) References Cited

U.S. PATENT DOCUMENTS 5,589,715 A * 12/1996 Nishitani ............... B60K 37/02
307/10.1
5,663,866 A *  9/1997 Ichikawa ............... B60K 37/02
361/643

(Continued)

FOREIGN PATENT DOCUMENTS

CN      1259781 A    7/2000
CN      1260619 A    7/2000
(Continued)

*Primary Examiner* — Hal Kaplan
*Assistant Examiner* — Jagdeep S Dhillon
(74) *Attorney, Agent, or Firm* — Robert J. Myers

(57) ABSTRACT

An electrical junction box includes a plurality of relays, a relay carrier, and a lead frame including connecting sections. Each relay includes electrical connection pins enabling the relay to be plugged into the relay carrier, thereby enabling electrical connection to the lead frame. Each relay includes a communication bus interface that is connected to a control pin of the relay. The lead frame includes a section forming a communication bus. The control pins of the relays are electrically connected to the section forming the communication bus when the relays are plugged into the relay carrier.

17 Claims, 5 Drawing Sheets

(58) Field of Classification Search
CPC .... B60R 16/0239; H01R 12/00; H01R 13/46; G05B 15/02; H05K 7/02; H05K 3/02; G01D 11/24; G01D 11/245
USPC ............... 307/9.1, 112, 10.1, 1, 31, 66, 64; 439/76.2, 76.1; 361/611
See application file for complete search history.

(56) References Cited

U.S. PATENT DOCUMENTS

| | | | |
|---|---|---|---|
| 6,310,293 B1 | 10/2001 | Kawakitz | |
| 6,325,640 B1 | 12/2001 | Kasai | |
| 6,642,633 B1* | 11/2003 | Yang | H01M 2/1083 307/10.1 |
| 7,125,262 B2* | 10/2006 | Saka | H05K 7/026 439/76.2 |
| 7,733,632 B2* | 6/2010 | Ito | H01H 50/021 174/520 |
| 8,723,038 B2 | 5/2014 | Sakai et al. | |
| 2006/0211300 A1* | 9/2006 | Kubota | B60R 16/0238 439/535 |
| 2012/0094509 A1* | 4/2012 | Bryan | B60Q 11/005 439/76.1 |
| 2013/0145844 A1* | 6/2013 | Hauschel | G01D 11/245 73/431 |
| 2015/0381108 A1* | 12/2015 | Hoft | H02S 50/10 136/244 |
| 2016/0026201 A1* | 1/2016 | Vellanki | G05F 1/66 700/297 |

FOREIGN PATENT DOCUMENTS

| | | | |
|---|---|---|---|
| CN | 102855962 A | 1/2013 | |
| EP | 1530411 A1 * | 5/2005 | ......... B60R 16/0238 |
| EP | 1530411 A1 | 5/2005 | |
| EP | 1780853 A1 | 5/2007 | |
| JP | 2014079093 A | 5/2014 | |
| WO | 9818180 A1 | 4/1998 | |

\* cited by examiner

ELECTRIC CURRENT DISTRIBUTION SYSTEM FOR A VEHICLE

CROSS-REFERENCE TO RELATED APPLICATIONS

This application is a national stage application under 35 U.S.C. § 371 of PCT Application Number PCT/EP2016/070646 having an international filing date of Sep. 4, 2016, which designated the United States, said PCT application claiming the benefit of French Patent Application No. 1558228, filed Sep. 4, 2015, the entire disclosure of each of which are hereby incorporated herein by reference.

TECHNICAL FIELD OF THE INVENTION

The present invention relates to an electronic device and more particularly to an electrical junction box of an electric current distribution system for a vehicle.

BACKGROUND OF THE INVENTION

An electrical junction box for a vehicle is generally an electrical module including switching elements enabling electric current to be distributed to the various accessories of the vehicle. This junction box is generally denoted using various other terms, such as 'power distribution box' or 'relay box'. This box is generally controlled by an electronic control module including a microcontroller enabling the acquisition of commands from the user of the vehicle.

The electrical junction box of a vehicle is the core for power distribution and circuit protection in the vehicle. The main aim of the electrical junction box is to provide a central location for the electric power and signal distribution for the circuits of vehicles, and their associated electrically controlled components. The electrical junction box includes a power distribution system and a printed circuit board for controlling the assembly of fuses and switching devices, such as relays. The electrical junction box is in electrical communication with a control housing. The control housing is a control unit that processes the commands from the user of the vehicle, and sends signals to the relays contained in the electrical junction box so as to control the windscreen wipers, the car lights, the defrosting system, etc. The control housing and the electrical junction box are typically two separate assemblies that are situated remotely from one another inside the body of the vehicle.

The relays are conventionally controlled by electronic modules via connections that are wired to the control housing. The electrical junction box is generally linked to the control housing via a wiring harness and standard cable connectors, thereby leading to a large number of connectors, connector strips and copper tracks on the printed circuit board.

BRIEF SUMMARY OF THE INVENTION

An electrical junction box for a vehicle includes a plurality of relays, a relay carrier, and a lead frame including connecting sections. Each relay includes electrical connection pins enabling the relay to be plugged into the relay carrier and enabling electrical connection to the lead frame. Each relay includes a communication bus interface that is connected to a control pin of the relay. The lead frame includes a section forming a communication bus. The control pins of the relays are electrically connected to the section forming a communication bus when the relays are plugged into the carrier.

The section forming a communication bus makes it possible to dispense with the use of a printed circuit board as an electronic carrier for the communication bus. The use of relays specifically including a communication bus interface, and the use of a section of the lead frame as a communication bus, makes it possible to dispense with a plurality of independent sections for individually controlling each relay. Specifically, the communication bus that is formed by a section of the lead frame makes it possible to provide a control section that is common to all of the relays. The communication bus enables each controlled relay to be addressed individually.

The section forming a communication bus may be coupled electrically to an electrical ground section of the lead frame so as to form an electrical capacitor. The section forming a communication bus may have a thickness smaller than the other sections. The relay may include an electromechanical switch provided to enable the flow of electric current distributed to the electrical loads of the vehicle, or a semiconductor switch provided to enable the flow of electric current distributed to the electrical loads of the vehicle.

The communication bus may be of a Local Interconnect Network (LIN) type. The lead frame may include another section forming a differential pair transmission bus with the section forming a communication bus, another control pin of the relay being connected electrically to the other section forming a differential pair transmission bus. The electrical junction box may additionally include an electrical connection strip towards the outside of the box, the strip being connected electrically to the section forming a communication bus.

An electric current distribution system for a vehicle may include a control housing equipped with a microcontroller, and an electrical junction box such as described above. The control housing may include a communication bus interface linked electrically to the section forming a communication bus of the electrical junction box.

BRIEF DESCRIPTION OF THE SEVERAL VIEWS OF THE DRAWING

Other characteristics and advantages of the invention shall appear upon reading the detailed description and the appended drawings, in which.

DETAILED DESCRIPTION OF THE INVENTION

Figure 1:
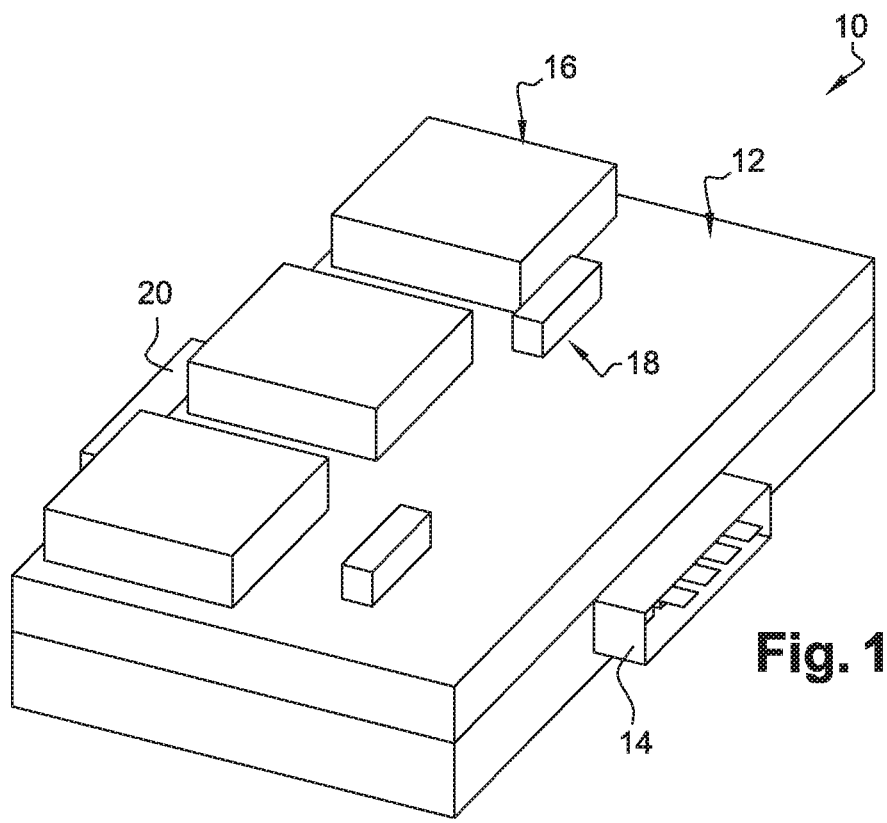
FIG. 1 is a perspective view schematically showing an assembled electrical junction box according to the invention.

According to FIG. 1, a nonlimiting example of an electrical junction box 10 for a vehicle is presented. The electrical junction box 10 includes a housing 12 provided with a first connector 14 enabling the electrical junction box 10 to be connected to a network for distributing electric current to the various electrical loads of the vehicle. The electrical junction box 10 also includes relays 16 mounted on the outside of the housing 12, thus enabling them to be accessed. The electrical junction box 10 also includes fuses 18 providing electrical protection of the network for electrical distribution to the various electrical loads of the vehicle. The electrical junction box 10 includes a second connector 20 enabling the electrical junction box 10 to be connected electrically to control signals, the control signals making it possible to ensure the switching of the relays 16 so as to supply power to the various electrical loads of the vehicle.

The electrical junction box 10 might also not include fuses 18 mounted on the housing 12, in particular when the electrical protection of the electrical junction box 10 is ensured upstream or downstream thereof, that is to say is ensured by another housing connected to the electric current distribution network. The number of connectors of the electrical junction box 10 is obviously not limited to two connectors. This depends on the electrical topology of the electrical distribution network; if appropriate, a single connector may group together the control signals and the electric current distribution signals. The first and second connectors 14, 20 enabling the electrical junction box 10 to be connected to a network for distributing electric current to the various electrical loads of the vehicle may be replaced by other connection means, such as for example electrical connections of screwed terminal type or by terminals (or contacts) that are inserted individually into the electrical junction box 10.

Figure 2:
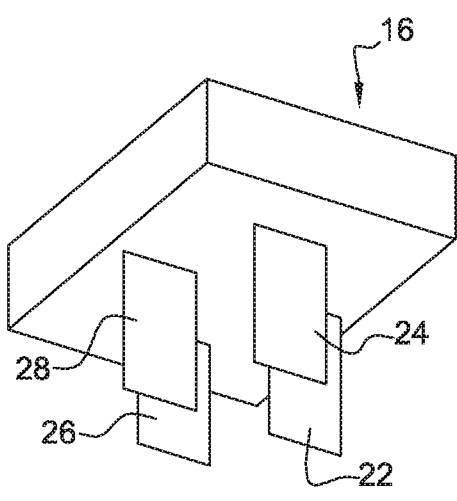
FIG. 2 is a perspective view schematically showing a relay of the electrical junction box of FIG. 1, and that more particularly shows the bottom of the relay.

According to FIG. 2, each relay 16 includes four pins. A first pin 22 and a second pin 24 enable electric current to be distributed to the electrical loads of the vehicle. A third pin 26 and a fourth pin 28 ensure the control of the relay 16. The relay 16 is an electrical load-switching component, operating as a controllable switch. The first, second, third, and fourth pins 22, 24, 26, 28 of each relay 16 enable the relays 16 to be interfaced with the elements of the electrical circuit that transmit the electrical signals required for operation thereof.

The number of pins of the relays 16 is not limited to four. Relays 16 including, for example, eight pins in the case of a dual relay may also be suitable for an embodiment of the invention. The assignment of the pins of the relays is unimportant; only the primary functions of a relay, namely controlling the relay and driving the electrical loads, are required for the invention.

Figure 3:
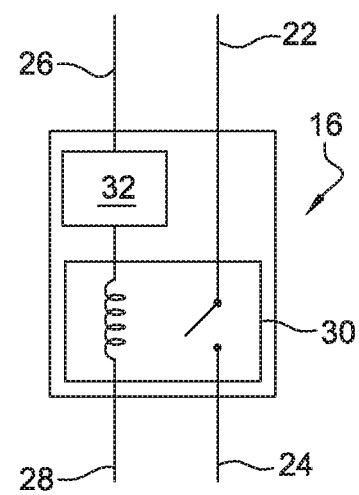
FIG. 3 is a diagram showing the electrical architecture of the relay of FIG. 2.

According to FIG. 3, each relay 16 includes an electromechanical switch 30 connected between the first pin 22 of the relay 16 and the second pin 24 of the relay 16. The switch 30 is also connected to the fourth pin 28 of the relay 16, referred to as the electrical ground pin of the relay 16. The relay 16 also includes a communication bus interface 32. The communication bus interface 32 is connected to the third pin 26, referred to as the control pin, of the relay 16, and also to the switch 30. When the switch 30 is put into the closed position, it makes it possible to switch the electric current distributed to the electrical loads of the vehicle from the first pin 22 to the second pin 24. The switch 30 of the relay 16 is therefore the electrical element through which the electric current distributed to the electrical loads of the vehicle transits. When the switch 30 is controlled into the open position, the electric current no longer flows from the first pin 22 to the second pin 24. The communication bus interface 32 is an addressing bus interface that makes it possible to connect all of the third pins 26 of the relays 16 to one another. The switching of a relay 16 takes effect following an addressing specific to the relay 16 that is to be switched.

The invention is not limited to electromechanical switches. Semiconductor switches, such as for example metal-oxide-semiconductor field effect transistor (MOSFET) power transistors or 'smart' power transistors, may be suitable for the invention.

Figure 4:
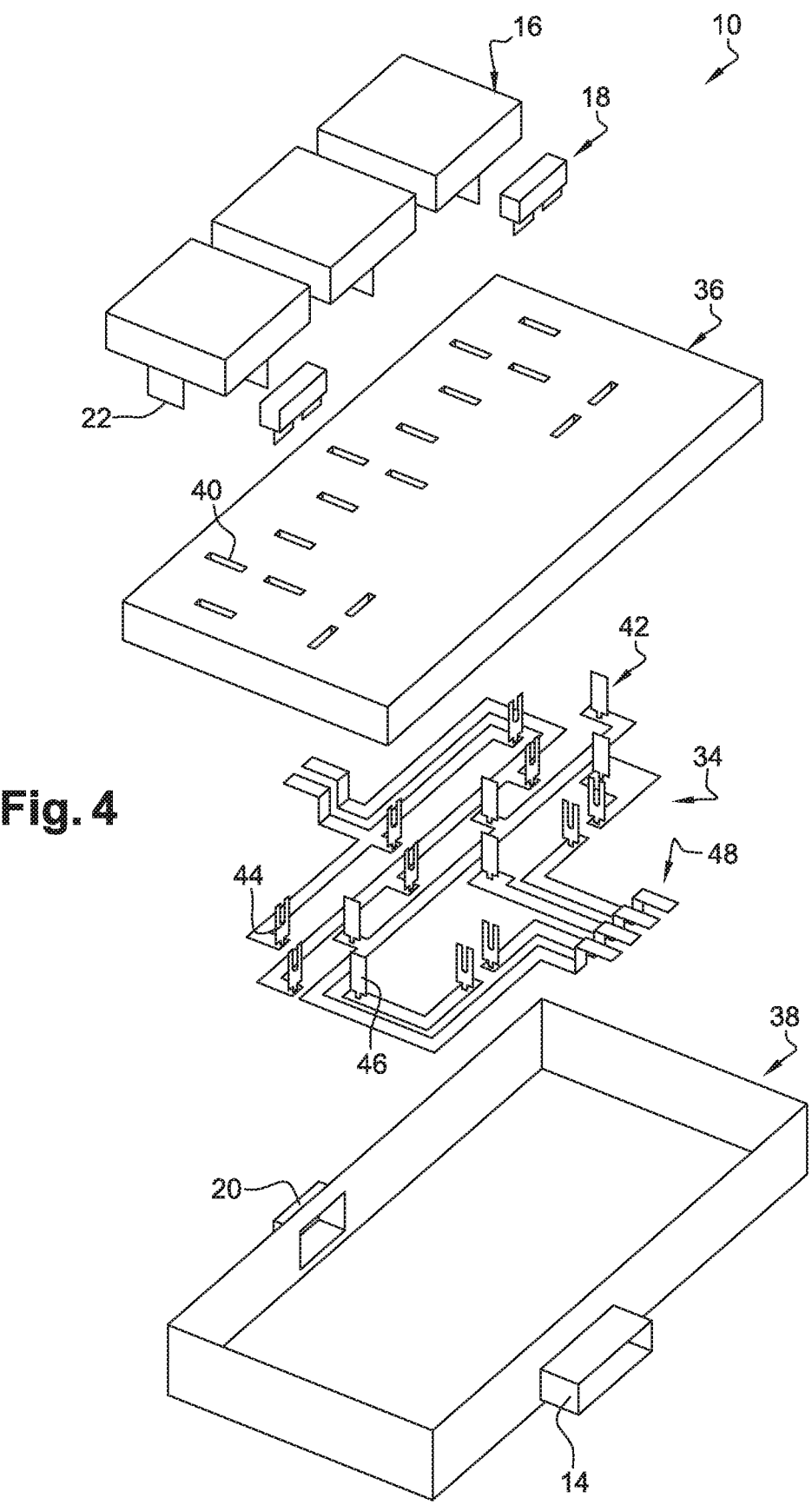
FIG. 4 is a perspective, exploded view schematically showing the electrical junction box of FIG. 1.

According to FIG. 4, the electrical junction box 10 for a vehicle includes the relays 16, the fuses 18 and a lead frame 34. The electrical junction box 10 also includes a relay carrier 36 and a housing bottom 38, thus forming the housing 12. The relay carrier 36 includes apertures 40 into which the relays 16 and the fuses 18 are plugged. The lead frame 34 is equipped with contact pins 42 with which the first, second, third, and fourth pins 22, 24, 26, 28 of the relays 16 and of the fuses 18 come into contact, such that the first, second, third, and fourth pins 22, 24, 26, 28 of the relays 16 and of the fuses 18 are in electrical continuity with the lead frame 34. The lead frame 34 and the relay carrier 36 are therefore arranged such that the first, second, third, and fourth pins 22, 24, 26, 28 of the relays 16 are able to be connected electrically to the lead frame 34. The contact pins 42 are forked contacts 44 or flat contacts 46, also called female contacts. The contact pins 42 are linked electrically to the lead frame 34 by known means, such as for example by soldering or by insertion. The contact pins 42 that are forked contacts 44 are also commonly referred to under the term 'tuning forks'.

As an alternative, the relay carrier 36 and the housing bottom 38 may be made of a single part forming the housing 12 of the electrical junction box 10. The invention is also not limited to an electrical junction box 10 including relays 16, and other electrical components, such as for example power resistors or diodes, may also be plugged into the relay carrier 36. The contact pins 42 may also have various geometries, the role of these pins being to ensure the electrical contact between the components plugged into the relay carrier 36 and the lead frame 34.

Figure 5:
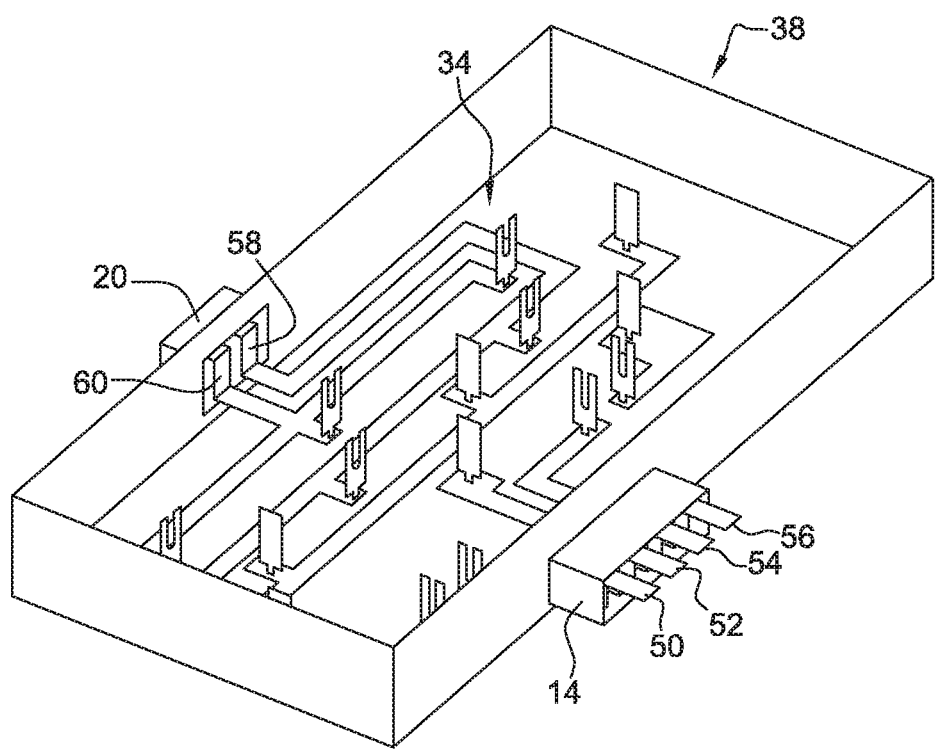
FIG. 5 is a perspective view schematically showing the inside of the electrical junction box of FIG. 1.

According to FIG. 5, the lead frame 34 is fixed to the housing bottom 38. The lead frame 34 may be fixed in several known ways, such as for example by overmolding in a housing of plastic or resin type, or by adhesive bonding. According to FIG. 4 and FIG. 5, the lead frame 34 includes strips 48 (or male contacts) that are inserted into the first and second connectors 14, 20, thus ensuring that the electric current distribution network of the vehicle and the relay switching control signals are in electrical contact with the lead frame 34. The first connector 14 includes a strip 50 for supplying power to the electrical junction box 10 and strips 52, 54, 56 for driving loads of the vehicle that are connected to the electrical junction box 10. The second connector 20 includes a strip 58 for controlling the relays 16 and an electrical ground strip 60. By way of example, the electrical loads of the vehicle may be lighting systems, windscreen wipers, the rear defrosting system, the air conditioning system, etc.

Although shown as being coplanar, the lead frame 34 may have various geometric forms. A non-coplanar lead frame 34 may prove necessary in the case of an electrical junction box 10 including a significant number of relays 16. The strips of the connectors may also be independent of the lead frame 34, that is to say the first connector 14 may have its own strips 48 that may be connected to the lead frame 34, for example by soldering or by insertion.

Figure 6:
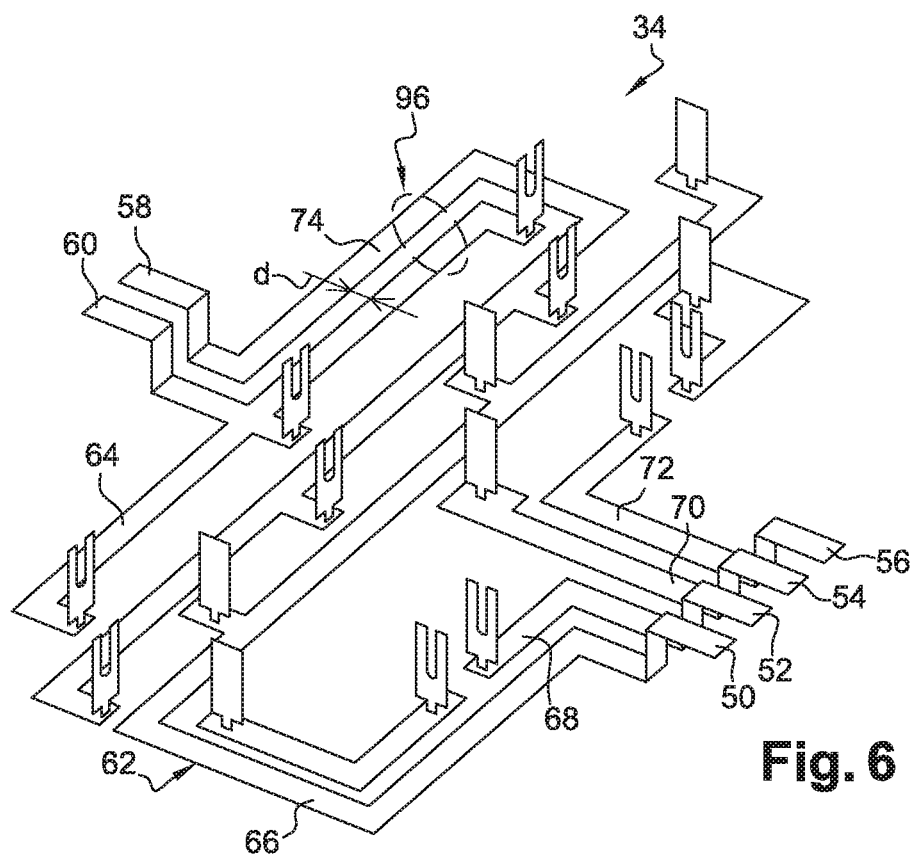
FIG. 6 is a perspective view schematically showing the lead frame of the electrical junction box of FIG. 1.

According to FIG. 6, the lead frame 34 includes connecting sections 62. The lead frame 34 includes, in particular, an electrical ground section 64, an electrical power supply section 66 and sections 68, 70, 72 for driving the loads of the vehicle. The lead frame 34 also includes a section forming a communication bus 74. The first pins 22 of the relays 16 are connected electrically to the electrical power supply section 66 of the box, and the fourth pins 28 of the relays 16 are connected to the electrical ground strip 60. The second pins 24 of the relays 16 are linked to the various sections 68, 70, 72 for driving the electrical loads of the vehicle. The third pins 26 of the relays 16 are linked to the section forming a communication bus 74. Likewise, the strip 50 for supplying power to the electrical junction box 10, the electrical ground strip 60, the strip 58 for controlling the relays 16 and the strips 52, 54, 56 for driving electrical loads of the vehicle are connected electrically to the electrical power supply section 66, to the electrical ground section 64, to the section forming a communication bus 74 and to the sections 68, 70, 72 for driving the loads of the vehicle, respectively. The strip 58 for controlling the relays 16 therefore forms part of the section forming a communication bus 74.

The advantages of using an electrical junction box 10 including a section of the lead frame 34 forming a communication bus 74 are those of simplifying the manufacture and the assembly of the electrical junction box 10 and reducing assembly times and therefore production costs. Using relays 16 including a communication bus interface 32 with the electrical junction box 10 according to the invention also makes it possible to optimize the electrical architecture of the vehicle equally with regard to the number of control wires required to drive the electrical junction box 10 and with regard to the cost of the electrical junction box 10.

The section of the lead frame 34 forming a communication bus 74 may be of a Local Interconnect Network (LIN) type. The section forming a communication bus 74 is preferably also coupled electrically to the electrical ground section 64 so as to form a capacitor 96. The section forming a communication bus 74 and the electrical ground section 64 are then close enough to one another to form the electrodes of the capacitor 96. The electrical value of the capacitor 96 will be able to be adjusted depending on the geometric features of the section forming a communication bus 74 and of the electrical ground section 64, but also on the distance d separating these two sections. This capacitor 96 enables filtering of electrical noise on the section forming a communication bus, the electrical noise possibly being caused for example by electrical interference originating from the environment in which the electrical junction box 10 is installed. This capacitor 96 makes it possible to optimize the data transmission speed to around a few tens of kilobits per second. The section forming a communication bus 74 may also have geometric dimensions that are different from the other sections, in particular a smaller thickness than the other sections of the lead frame 34. Specifically, the section forming a communication bus 74 does not transport high electric currents such as those required to drive the loads of the vehicle. The first connector 14 may also include other connection strips. As an alternative, the capacitor 96 may be an electronic component connected electrically between the section forming a communication bus 74 and the electrical ground section 64.

Figure 7:
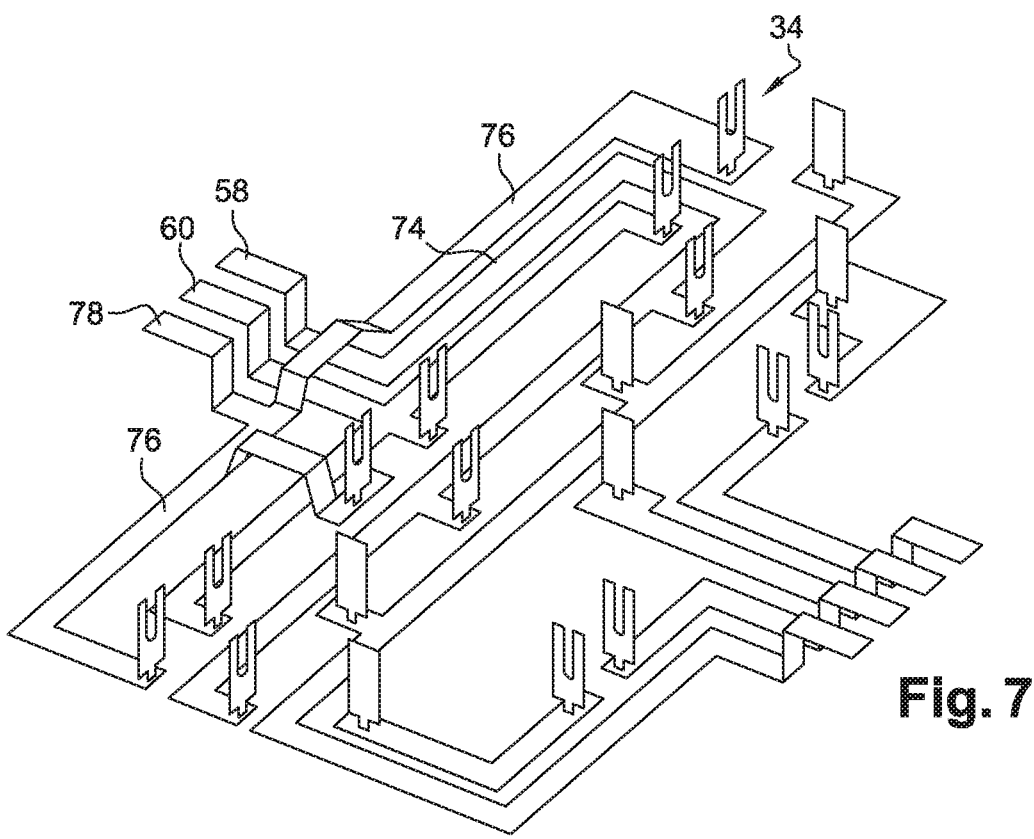
FIG. 7 is a view similar to that of FIG. 6, schematically showing a lead frame of the junction box according to a second embodiment.
Figure 8:
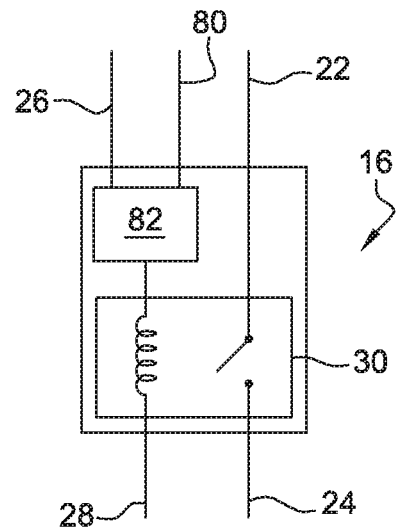
FIG. 8 is a diagram similar to that of FIG. 3, showing the electrical architecture of a relay according to the second embodiment.

According to FIG. 7, in another embodiment, the lead frame 34 may include another connecting section 76 forming a differential pair communication bus 74, 76 with the section forming a communication bus. This connecting section 76 will preferably have similar geometric features and will have an alignment parallel to the section forming a communication bus 74. The second connector 20 also includes an additional strip 78 connected electrically to the other connecting section 76 forming a differential pair communication bus 74, 76. The differential pair communication bus 74, 76 may be for example of controller area network (CAN) type. Also in this alternative embodiment and according to FIG. 8, the relays 16 include another control pin 80 to which the other connecting section 76 forming a differential pair communication bus 74, 76 is connected electrically. In this particular embodiment, the relays 16 therefore include two control pins 26, 80. The relays 16 include a differential pair communication bus interface 82 that is connected to the two control pins 26, 80. The other features of this embodiment are similar to the embodiment described previously.

Figure 9:
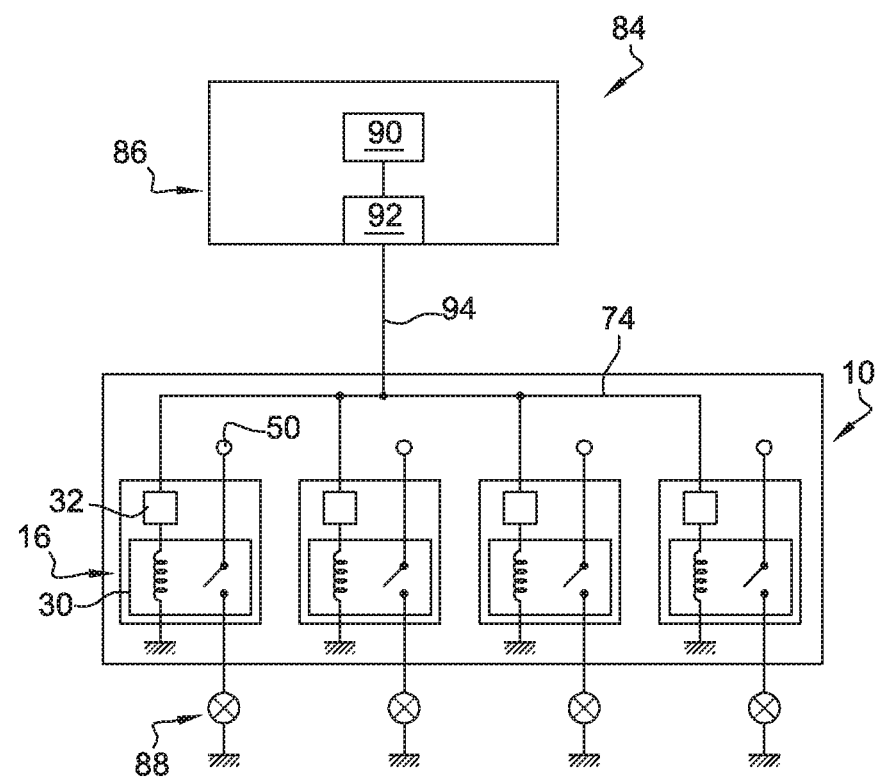
FIG. 9 is a block diagram schematically showing an electric current distribution system for a vehicle including a junction box according to the invention.

According to FIG. 9, an electric current distribution system 84 for a vehicle may include a control housing 86, the electrical junction box 10 such as described in the previous embodiments, and electrical loads 88 of the vehicle. The control housing 86 includes a microcontroller 90 and a communication bus interface 92. The microcontroller 90 and the communication bus interface 92 of the control housing 86 are linked electrically to one another. The communication bus interface 92 of the control housing 86 is linked electrically to a wiring harness 94 of the vehicle. The wiring harness 94 interfaces electrically with the electrical junction box 10 such that the communication bus interface 92 of the control housing 86 is connected electrically to the section forming a communication bus 74 of the electrical junction box 10. The commands to activate an electrical loads 88 of the vehicle are thus detected by the control housing 86. This control housing 86 sends a command to switch a relay 16 driving an electrical load 88 to be activated to the electrical junction box 10 via the communication bus 74, 92.

In a functional manner the microcontroller 90 of the control housing 86 recognizes the activation of the command in the passenger compartment of the vehicle when a user of a vehicle wishes to control an electrical load 88, such as for example the air conditioning. The microcontroller 90 then transmits the command to the communication bus interface 92 of the control housing 86. By way of the communication bus interface 92 of the control housing 86, a message is transmitted to the electrical junction box 10 on the communication bus 92. The message includes the command to activate the air conditioning. This message also includes the identity of the relay 16 to be activated. In other words, the message includes a message that is addressed to a given relay 16, this relay 16 being the one that enables the air conditioning to be activated. The communication bus 92 is linked electrically to the section of the lead frame 34 forming a communication bus 74 of the electrical junction box 10. As illustrated previously by FIG. 5, this electrical link is formed by the strip 58, for controlling the relays 16, of the second connector 20, this strip 58 forming part of the section forming a communication bus 74. The communication bus interfaces 32 connected to the section forming a communication bus 74 receive the command flowing on the section forming a communication bus 74. The relays 16 whose identity is not the one addressed by the message are not activated. That relay 16 of the electrical junction box 10 to which the message is addressed closes its switch 30 so that the strip 50 of the electrical junction box 10 supplies power to the electrical load 88 in question, namely the air conditioning system in this example. In other words, when the switch 30 of the relay 16 is closed, the electric current is able to flow from the power supply strip 50 of the electrical junction box 10 to the electrical load 88.

The advantages of such an electric current distribution system 84 for a vehicle are the possibility of directly diagnosing a possible fault with the load driven by the relay 16, and reducing the overall consumption of such a system, its weight and therefore also its cost. By way of example, the faults diagnosed on the load may be of 'short-circuit' type or also of 'open-circuit' type. These faults are detected by the communication bus interface 32 of the relays 16, and are therefore communicated directly to the control housing 86. The control housing 86 makes it possible for example to inform the user of the vehicle to visit a garage to rectify the fault. Also, the consumption of such an electric current distribution system 84, in particular the electrical consumption of the communication bus 74, is reduced in comparison with known systems in which a communication bus interface is fixed to a printed circuit board of the electrical junction box 10. According to the invention, the consumption of the electric current distribution system 84 will depend directly on the number of relays 16, including a communication bus interface 32, that are plugged into the electrical junction box 10. The weight of the electric current distribution system 84 is also reduced as the system dispenses with a printed circuit board.

The invention claimed is:

1. An electrical junction box, comprising:
   a lead frame having a first, second, third, and fourth section;
   a relay carrier electrically interconnected to the lead frame; and
   a plurality of relays including electrical connection plugged into the relay carrier and electrically connecting the plurality of relays to the lead frame, wherein each relay of the plurality of relays comprises a control pin connected to the first section of the lead frame forming a communication bus, wherein the first section forming the communication bus is electrically coupled to the electrically grounded second section of the lead frame, thereby forming an electrical capacitor.

2. The electrical junction box according to claim 1, wherein the first section forming the communication bus has a thickness that is less than the second section of the lead frame.

3. The electrical junction box according to claim 1, wherein the relay includes an electromechanical switch.

4. The electrical junction box according to claim 1, wherein the relay includes a semiconductor switch.

5. The electrical junction box according to claim 1, wherein the communication bus is a Local Interface Network type.

6. The electrical junction box according to claim 5, wherein the third section forms a differential pair transmission bus with the first section forming the communication bus and wherein another control pin of the relay is connected electrically to the third section forming the differential pair transmission bus.

7. The electrical junction box according to claim 1, wherein the electrical junction box further comprises a strip configured for controlling the relays disposed near the periphery of the electrical junction box, said strip electrically connected to the first section forming the communication bus.

8. An electric current distribution system, comprising:
   a control housing equipped with a microcontroller; and
   the electrical junction box according to claim 1, wherein the control housing includes a communication bus interface linked electrically to the first section forming the communication bus of the electrical junction box.

9. An electrical junction box for a vehicle, comprising:
   a plurality of relays;
   a relay carrier; and
   a lead frame comprising connecting sections, wherein each relay includes electrical connection pins enabling the relay to be plugged into the relay carrier and electrically connecting the plurality of relays to the lead frame, wherein each relay comprises a communication bus interface that is connected to a control pin of the relay, and wherein the lead frame includes a section forming a communication bus.

10. The electrical junction box according to claim 9, wherein the communication bus is electrically coupled electrically to an electrical ground section of the lead frame, thereby forming an electrical capacitor.

11. The electrical junction box according to claim 10, wherein section forming the communication bus has a thickness that is less than a thickness of the other sections of the lead frame.

12. The electrical junction box according to claim 9, wherein the relay includes an electromechanical switch provided to enable the flow of electric current distributed to the electrical loads of the vehicle.

13. The electrical junction box according to claim 9, wherein the relay includes a semiconductor switch provided to enable the flow of electric current distributed to the electrical loads of the vehicle.

14. The electrical junction box according to claim 9, wherein the communication bus is a Local Interface Network type.

15. The electrical junction box according to claim 9, wherein the lead frame includes another section forming a differential pair transmission bus with the section forming the communication bus, and wherein another control pin of the relay is connected electrically to the other section forming the differential pair transmission bus.

16. The electrical junction box according to claim 9, wherein the electrical junction box further comprises at least one strip configured for controlling the relays, directed towards the outside of the electrical junction box, said strip being electrically connected to the section forming the communication bus.

17. An electric current distribution system for a vehicle, comprising:
   a control housing equipped with a microcontroller; and
   the electrical junction box according to claim 9, wherein the control housing includes a communication bus interface linked electrically to the section forming the communication bus of the electrical junction box.

* * * * *